Patented July 26, 1938

2,124,706

UNITED STATES PATENT OFFICE 2,124,706

STABILIZED FATS AND METHOD FOR PREVENTING RANCIDITY

Donald J. Maveety, Millburn, N. J., assignor to National Biscuit Company, New York, N. Y., a corporation of New Jersey No Drawing. Application March 14, 1935, Serial No. 11,001

7 Claims. (Cl. 99—163)

My invention pertains to stabilized fats and a method for preventing rancidity in oils and fats or in materials containing oils and fats.

Substantially all fats such as lard, butter, vegetable oils and the like and substances containing them such as bakery products, potato chips, soaps and other materials, develop an objectionable odor or rancidity. Many efforts have been made to prevent or counteract this rancidity, and while some of them are effective, in whole or in part, none of them has come into extensive commercial use either because too expensive or because of their deleterious effect upon the flavor or food value of the fat or ultimate product.

By means of the present invention, I am able to prevent rancidity in fats for long periods of time without materially increasing their cost and without depreciating their food value or adding objectionable properties.

In my investigation, I have found that a small amount of spices, spice oil, exhausted residue from the distillation of spice oils, resinous extracts from spices and from some varieties of wood or molasses added to a fat or shortening will prevent the development of rancidity over long periods of time.

As one example, I have found that the addition to lard of a very small quantity varying from .01% to 5% of the pulverized residue from the steam distillation of oil of cloves, increases the period of time that it stays free from rancidity by eight times or more. Other spices and their oils and residues, and resinous extracts are similarly effective, the period of immunity to rancidity, under fixed conditions of temperature, light and air, varying with the quantity of the preventative that is added.

When the shortening is to be used in bakery products, there is no objection, as a rule, to the small amount of residue that has been added because its color and odor, if any, will blend with the baked goods. But in case of some bakery products, such as soda crackers and other foods where even slight discoloration is objectionable, I find that the shortening can be heated with the addition of the spice residue and after a few hours filtered off, which filtration removes all discoloration from the shortening and the treatment is still effective in preventing rancidity.

Many of the materials that I use to prevent rancidity, particularly the spice residues, are waste materials and their addition to the shortening does not substantially increase the cost.

In the case of lard, vegetable oils and other shortenings for commercial use, I first incorporate a small amount of the spice residue, usually from 0.1% to 1% by weight, with the shortening and then, after letting the melted mixture stand or temper for a time (1 to 5 hours), filter off the spice. The resulting shortening is not discolored nor is its food value impaired, yet its life as a usable shortening before turning rancid is increased manifold. The length of time for tempering the mixtures varys of course with the kind of stabilizer and fat as well as with the amount of stabilizer and effect to be produced.

When the shortening is to be used in bakery products or other cooked foods, it may be treated as above described by the refiner or manufacturer, or the spice residue or other preventative added to the dough.

It is well known that the steam process now used for refining lard decreases its resistance to rancidity, and when filtered through fuller's earth the lard takes on a flavor or odor that is characteristic of the filtrant. By means of my invention, the stabilizer may be added to the lard or oil before filtering, or it may be incorporated in the filter itself, so that the fat will be treated while being filtered. When fuller's earth is used as a filter with my invention, the filtered lard or oil does not take up the usual fuller's earth odor, but is free from objectionable odors and has its keeping qualities greatly increased. My invention is equally applicable to lard produced by the so-called drip or kettle rendered processes. In fact, with all edible fats, insofar as I know, it prevents the formation of free fatty acids, and the development of rancidity.

While I have referred specifically to spices, their oils and residues, such as clove, ginger, cinnamon, allspice, nutmeg, etc., as retarding rancidity, it is to be understood that the terms and ingredients herein stated are but illustrative of the invention, and I claim as my invention all equivalents that come within the scope of my claims.

What I claim is:

1. The method of retarding rancidity in oils and fats which comprises incorporating therein a small amount of the residue from the distillation of a spice oil.

2. The method of retarding rancidity in oils and fats which comprises incorporating therein a small amount of the residue from the distillation of clove oil.

3. The method of retarding rancidity in oils and fats which comprises incorporating therein from .01% to 5% of the residue from the distillation of a spice oil.

4. The method of retarding rancidity in oils and fats which comprises incorporating therein not more than 1% by weight of residue from distillation of spice oil.

5. The method of retarding rancidity in oils and fats which comprises mixing therewith a finely divided solid residue from the distillation of a spice, letting the mixture temper, and then filtering the finely divided solid out from the oil or fat.

6. A rancidity stabilized shortening comprising an edible fat containing a small quantity of solid residue from the distillation of spice oil.

7. A rancidity stabilized shortening comprising an edible fat containing from .01% to 5% of the solid residue from the distillation of clove oil.

DONALD J. MAVEETY.